Oct. 1, 1968
A. BOTELLO
3,403,800
LOAD DISPLACING DEVICE FOR HAND TRUCKS
Filed Feb. 9, 1967
4 Sheets-Sheet 1
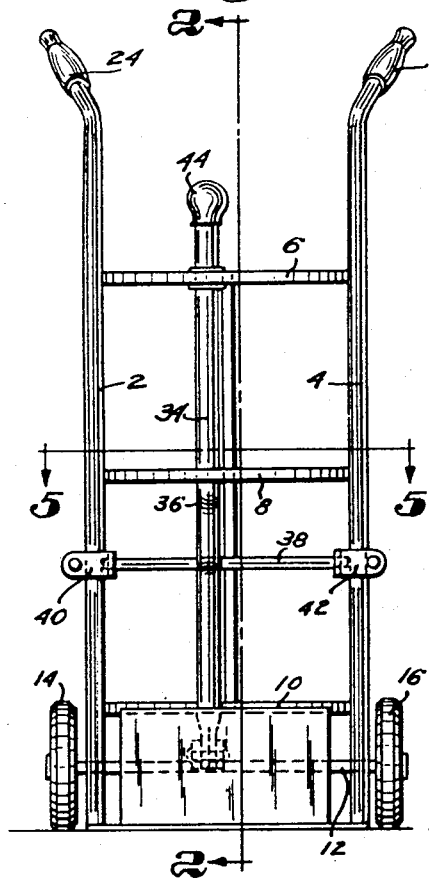
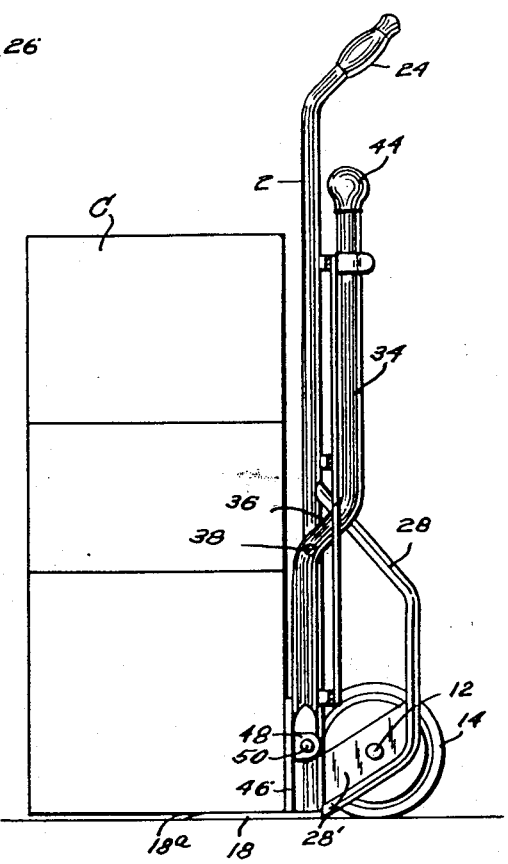
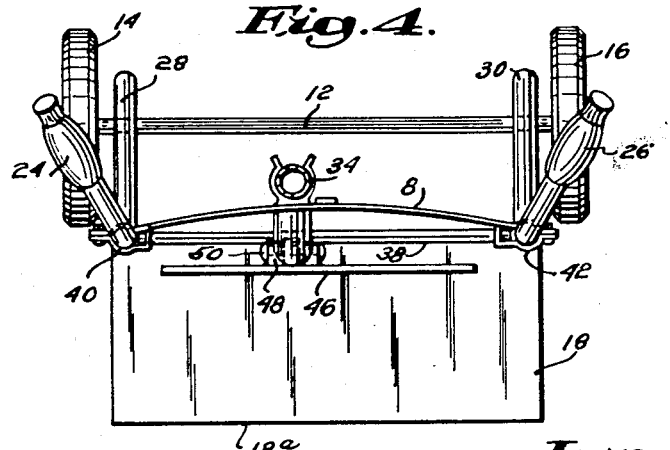
Inventor:
Americo Botello,
By [signature]
Attorney

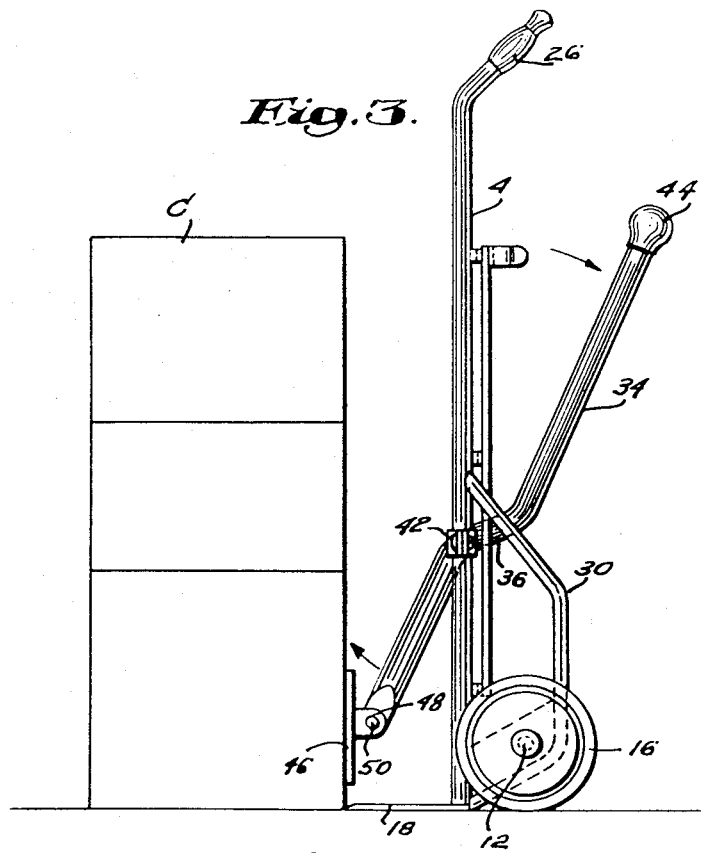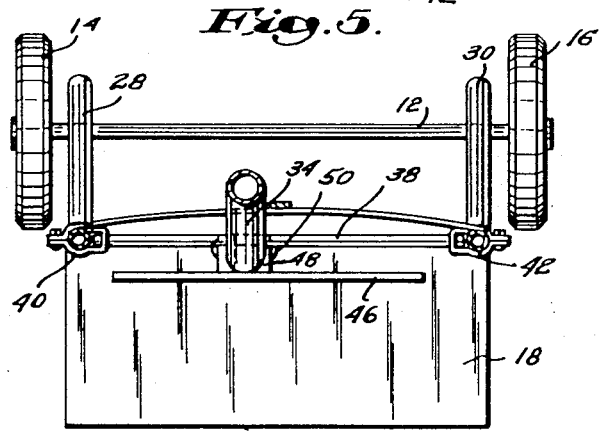

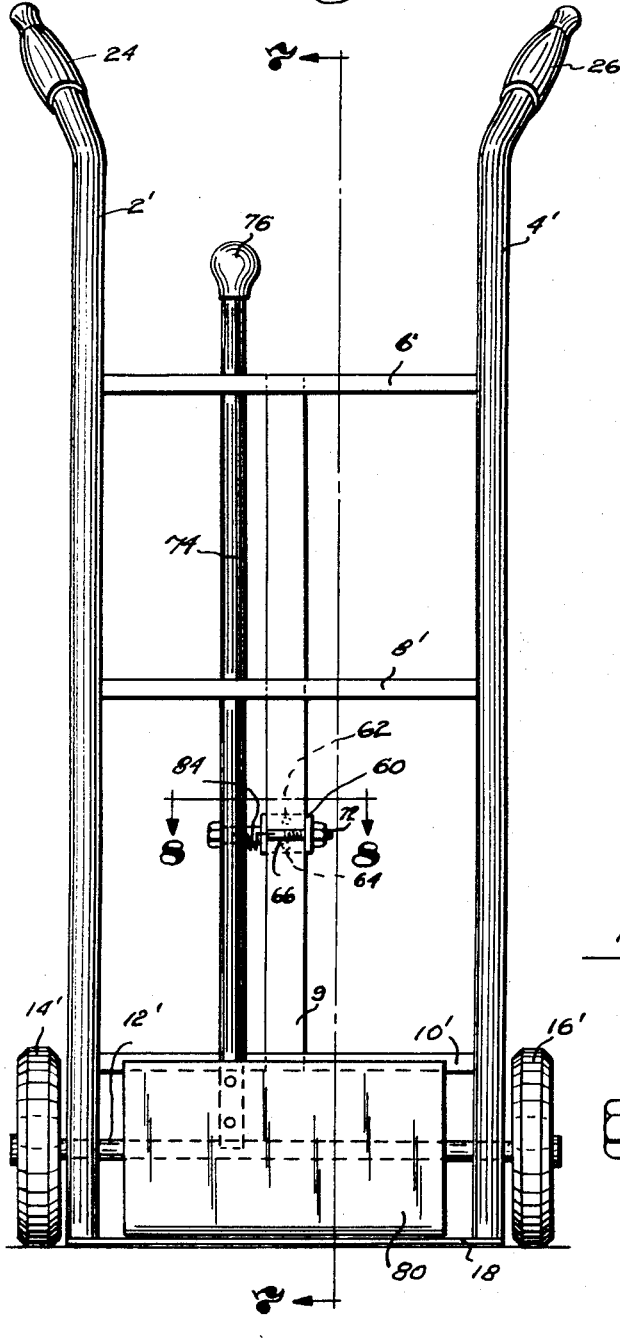
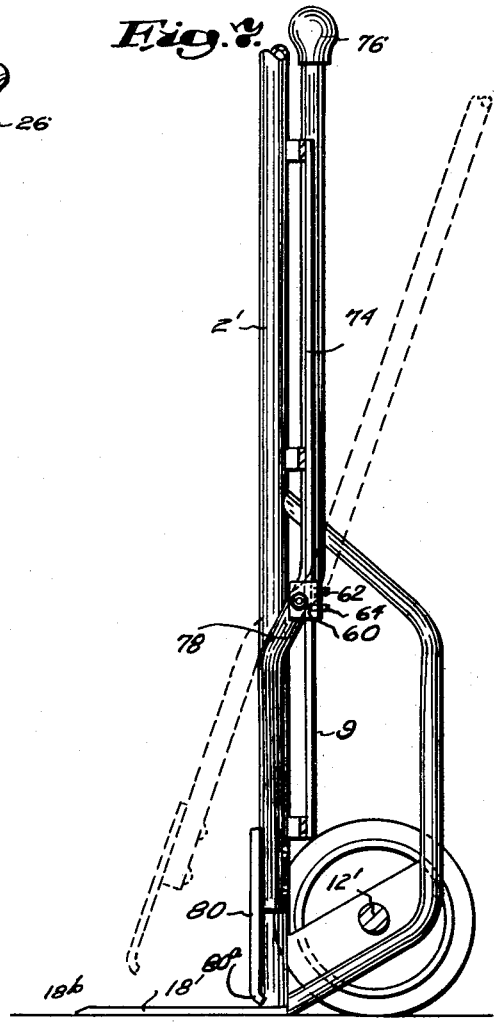

Oct. 1, 1968  A. BOTELLO  3,403,800
LOAD DISPLACING DEVICE FOR HAND TRUCKS
Filed Feb. 8, 1967  4 Sheets-Sheet 4

Inventor:
Americo Botello,
by Mumm H. Hamilton
Attorney

United States Patent Office 3,403,800
Patented Oct. 1, 1968

3,403,800
LOAD DISPLACING DEVICE FOR HAND TRUCKS
Americo Botello, 8 Oliver St., Somerville, Mass. 02143
Continuation-in-part of application Ser. No. 575,835,
Aug. 29, 1966. This application Feb. 8, 1967, Ser.
No. 614,713
6 Claims. (Cl. 214—511)

ABSTRACT OF THE DISCLOSURE

This invention relates to a pivoted lever assembly which can be quickly and conveniently attached to the flat portion of a hand truck and which includes as a part of the lever a presser shoe adapted to engage against an article loaded on the truck so as to exert displacement forces which act to displace the truck away from the load and release the toe plate.

---

This application is a continuation-in-part of my copending application Ser. No. 575,835 filed Aug. 29, 1966, for Load Displacing Device for Hand Trucks.

The present invention relates to hand trucks of the type having an upright frame body at the lower end of which is provided a toe plate and a pair of spaced apart wheels and at the upper end of which are a pair of handles by means of which the truck may be tilted and wheeled about with a load disposed thereon.

In the conventional form of hand truck it is customary to provide at the bottom of the frame body a toe plate member which is formed with a bevelled rounded edge designed to slide under the bottom surface of a bulky carton, crate or other article which is to be moved. In the usual operation the truck is wheeled up to the carton or crate and the toe plate is forced under the bottom edge of the article. In the case of relatively heavy crates or cartons or other objects to be handled, considerable weight is exerted on the toe plate and the truck may not be readily disengaged. To free the toe plate at the time of unloading, the crate or carton may be tilted forwardly which is sometimes inconvenient or difficult. The other alternative is to drag the toe plate away from the engaged surface which may also be inconvenient or difficult for one reason or another.

It is an object of the present invention to deal with the problem indicated and to devise a means for displacing the truck and its toe plate away from a loaded crate or carton without having to tilt or lift the carton.

Another specific object of the invention is to provide a displacer lever arrangement which may be attached to conventional forms of hand trucks and which may be conveniently forced into contact with a loaded carton or other shipping article.

Another object of the invention is to provide a pivoted displacing device which may be combined with the frame of a hand truck in such a manner that the handles of the truck and the displacer lever may be used to cooperate with one another in exerting a displacing force for moving the wheels of the truck rearwardly away from a load to disengage the toe plate member without need for tilting or lifting the load member.

Still another object is to devise a displacer arrangement which is spring loaded so that it may be resiliently contained in a hand truck.

With the foregoing objectives in mind, I have conceived of a pivoted lever assembly which can be quickly and conveniently attached to the flat portion of a hand truck at two opposite sides thereof and which includes as a part of the lever a presser shoe adapted to engage against an article loaded on the truck so as to exert displacement forces which act to displace the truck away from the load and release the toe plate.

The nature of the invention and its other objects and novel features will be more fully understood and appreciated from the following description of a preferred embodiment of the invention selected for purposes of illustration and shown in the accompanying drawings, in which:

FIGURE 1 is a front elevational view of a hand truck having the displacing lever assembly of the invention mounted thereon;

FIGURE 2 is a cross section taken on the line 2—2 of FIGURE 1;

FIGURE 3 is another elevational view illustrating the displacing lever assembly in operation and shown engaging the loaded carton of FIGURE 1 with truck backed away from the carton and the toe plate disengaged;

FIGURE 4 is a plan view of the invention;

FIGURE 5 is a plan cross section taken on the line 5—5 of FIGURE 1;

FIGURE 6 is a front elevational view of another form of the invention in which a spring loaded displacing lever arrangement is illustrated;

FIGURE 7 is a cross sectional view of the structure shown in FIGURE 6 taken on the line 7—7;

FIGURE 8 is a cross sectional view taken on the line 8—8 of FIGURE 6;

Figure 9:
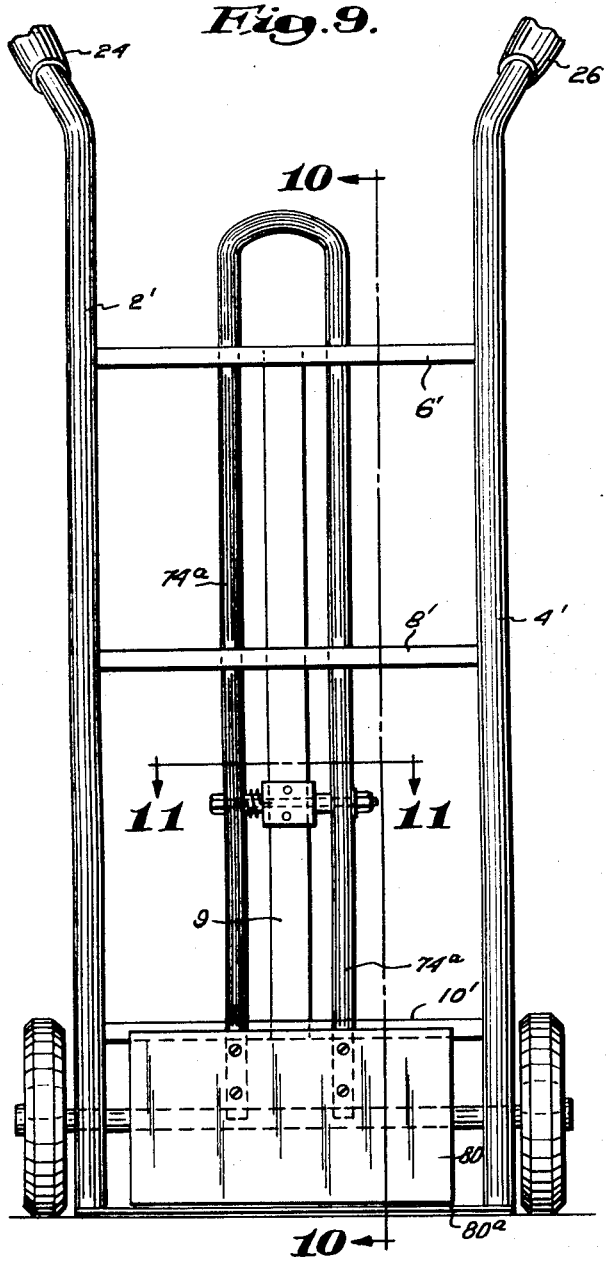
FIGURE 9 is a front elevation of a modified form of displacing lever mechanism.

Referring more in detail to the structure shown in the drawings, FIGURE 1 illustrates a hand truck body including vertical side frame parts 2 and 4 which have supported therebetween at spaced intervals transverse bars as 6, 8 and 10. Solidly anchored to the lower extremities of the frame parts 2 and 4 is a toe plate member 18 which projects forwardly of the frame and which is formed with a bevelled edge 18a. At the upper ends of the side frames 2 and 4 are provided handles 24 and 26 by means of which the hand truck is moved about.

Also provided in the truck body are spaced arms 28 and 30 which at their lower ends are formed with wheel bearing portions 28' and 30'. The arms may be secured to the frame by welding or other means. Extending through the wheel bearing portions 28' and 30' is a shaft 12 at opposite extremities of which are rotatably mounted truck wheels 14 and 16 which are located rearwardly of the toe plate 18 as shown in FIGURES 2, 3 and 4.

In accordance with the invention, I combine with the frame structure described a displacing lever mechanism which is constructed and arranged to be engaged against a loaded carton or crate supported on the toe plate 18 of the truck body when the latter member is in an upright position as shown in FIGURE 2. An important feature of the displacing lever mechanism is a transverse fulcrum bar on which the lever is pivotally mounted centrally of the frame and at a point well above the toe plate 18, as well as forwardly of the axis of rotation of the wheels 12 and 14.

Considering these several components in further detail, numeral 34 denotes the displacing lever element which in one preferred form may consist of a tubular body having an intermediate offset portion 36 through which is located a fulcrum bar 38. The bar 38 is transversely secured between the frame parts 2 and 4 by attaching clamps 40 and 42 detachably secured around adjacent surfaces of the frame parts as shown in the drawings. It is pointed out that the location of the fulcrum bar is well above and ahead of the axis of rotation of the truck wheels 14 and 16 as may be more clearly observed from an inspection of FIGURE 3.

At the upper end of the pivoted lever 34 is a knob 44 for gripping the lever and at the lower end of the lever is a presser shoe 46 consisting of a flat plate having a clevis portion 48. Pivotally secured in the clevis portion 48 by means of a pivot pin 50 is the lower extremity of the lever 34 which may, if desired, be flattened out and formed with an opening through which a pin 50 is located.

In operation the hand truck is wheeled up to a carton or crate C and the toe plate is forced under the bottom of the crate, preferably by tilting the member C forwardly. Thereafter the truck and loaded crate C is moved to a desired location and the truck assumes a vertically disposed position substantially as shown in FIGURE 2.

In this position the operator grips the knob 44 with one hand while holding against one of the handles 24 or 26 with the other hand and pivots the lever about the fulcrum bar 38. In thus gripping one of the handles the operator exerts a force to maintain the truck in an upright position.

As a result of this pivoting action there is induced a fulcrumming force which is exerted above and well ahead of the wheels and which is transmitted through the presser shoe 46 against the carton C. Forces of reaction are simultaneously set up in the frame sides and transmitted to the wheels causing these members to be displaced rearwardly and thereby retracting the toe plate from under the carton C into a position as shown in FIGURE 3. It will be observed that as the fulcrumming action is initiated forces are continuously exerted through the backing shoe 46 as the toe starts to move away from a load supported thereon. The pivotal attachment at the lower end of lever 34 to the clevis 50 permits the presser shoe to remain in a completely engaged position against the crate C as the wheels start to become displaced rearwardly and there is thus avoided any tendency for the edge of the presser shoe to become impressed into the carton C. Due to this secondary pivoting, therefore, the entire surface of the shoe is constantly maintained in contact with the carton and a maximum leverage of forces against the carton is thus realized.

It is pointed out that the mechanism described may be readily attached to existing hand trucks by means of the simple attaching means described. I may desire to construct the various parts out of any suitable material including metal tubing, plastic substances and the like.

In FIGURES 6–8 inclusive, I have illustrated another desirable form of the invention in which a novel spring loading arrangement is provided. As shown in FIGURE 6, I provide a hand truck of the same general construction as that of the hand truck illustrated in FIGURES 1–5 inclusive comprising frame parts 2' and 4' which have supported therebetween transverse bars as 6', 8' 10' and a vertically disposed center bar 9.

Similarly a toe plate 18' is secured to the lower ends of frame parts 2 and 4 having a bevelled edge 18b. Numerals 24' and 26' denote handles at the upper ends of the side frame. At the lower ends of the side frames is a shaft 12' supporting wheels 14' and 16' located rearwardly of the toe plate 18' as shown. For use with this structure as described, I have devised a spring-loaded displacing lever mechanism and attaching bracket means which includes a U-shaped bracket 60. This bracket 60 is constructed of a size and shape to snugly fit around an intermediate section of the center bar 9 as best shown in FIGURE 8 and is designed to be detachably secured to the center bar 9 by means of suitable fastening means such as screw members 62 and 64.

In each of the sides of the U-shaped bracket are formed openings through which is received a pivot bolt 66 having a hexagonal head 68 and a reduced diameter part 70 which is of approximately the same diameter as the bracket openings so that this reduced bolt section may be firmly held in the bracket in abutting relationship to an adjacent side of the center bar 9. The end of the reduced bolt section is threaded to receive a nut 72. It will be apparent that when the nut 72 is tightened the bracket 60 becomes solidly locked to the center bar.

Pivotally mounted on the relatively larger section of the retaining bolt 66 is a displacing lever 74 formed with a circular aperture through which the bolt is received as shown in FIGURE 8. The displacing lever is formed with an upper operating knob 76 and an intermediate offset portion 78 which extends downwardly to support at the lower end thereof a displacing shoe 80.

As shown in FIGURE 8 there is transversely located through one side of the offset over portion 78 a hole 82. Through this hole 82 is anchored at one end a coil spring element 84. The spring 84 extends around the member 66 as shown in FIGURE 8 and has its opposite extremity anchored in one side of the bracket 60 in a hole 60a.

With the two ends of spring 84 anchored as described, it will be seen that by grasping the knob 76 an operator may pivot the lever 74 in a rearwardly denoted manner as suggested in dotted lines in FIGURE 7. This will load tension spring 84 so that when the knob is released the lever and shoe 80 will seek to return to a normal starting position and the spring tension thus aids in disengaging the truck from a loaded article thereon.

Figure 10:
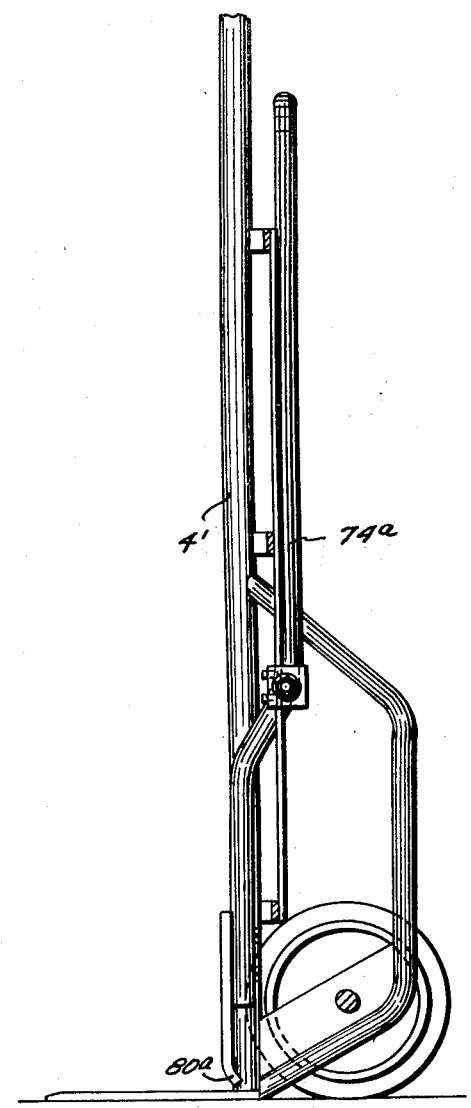
FIGURE 10 is a cross section taken on line 10—10 of FIGURE 9.
Figure 11:
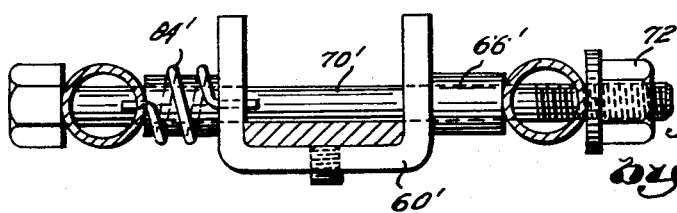
FIGURE 11 is a cross section taken on the line 11—11 of FIGURE 9.

In FIGURES 9 to 11 inclusive, the structure of FIGURES 6 to 8 has again been illustrated with the sole difference that the lever 74 has been replaced by a U-shaped lever 74a. This U-shaped member 74a is arranged to extend at either side of the vertical center bar 9 as best shown in FIGURE 9. A bolt 66' having a reduced portion 70' secures a bracket 60' about the center bar 9 by means of a nut 72. A spring 84' anchored as described above between the lever 74a and one side of the bracket 60' resiliently contains the lever in a position as shown in FIGURE 10. By means of the U-shaped conformation of the lever 74a it becomes possible to exert equal forces against a load from two sides of the center bar 9 and in so doing any torc or testing forces are eliminated with a maximum exertion of leverage against the load. In this modification of FIGURES 9 to 11 inclusive, I may also form the bottom of the shoe 80a with a curved lower portion which exerts a rolling effect on a load member as the lever is pivoted about its axis of turning.

While I have shown preferred embodiments of the invention, other changes and modifications may be practiced in accordance with the scope of the appended claims.

I claim:

1. In a hand truck a load supporting frame having a toe plate supported at the bottom thereof, a pair of wheels rotatably supported on either side of the frame at the lower end thereof, handle means located at the upper end of said frame, a displacing lever mechanism pivotally mounted in the load supporting frame, said displacing lever mechanism includes a fulcrum bar and clamp means for detachably securing the fulcrum bar at two opposite sides of the frame.

2. A structure according to claim 1 in which the displacing lever includes spring means for resiliently urging the displacer shoe against the truck frame.

3. In a hand truck a load supporting frame including spaced-apart frame sides, transverse reinforcing bars secured between the sides and a vertically disposed center bar rigidly fastened to the transverse reinforcing bars, a shaft supported between the lower ends and the frame sides and a pair of truck wheels rotatably mounted at opposite sides of the shaft, a toe plate attached to the lower extremities of the frame sides in a forwardly disposed position relative to the said wheels, a displacer lever mechanism including a displacing lever, a displacer shoe fixed to the lower end of the lever, means for pivotally supporting an intermediate portion of the displacing lever on said frame, said means for pivotally supporting the lever includes an attaching bracket detachably secured to the center bar, a pivot bolt transversely located through the bracket and having the displacing lever pivotally received thereon.

4. A structure according to claim 3 in which the said pivot bolt is provided with a spring element for resiliently maintaining the lever against the load supporting frame.

5. A structure according to claim 4 in which the spring element consists in a coiled spring having one end anchored to the lever and the other end anchored to the bracket.

6. A structure according to claim 3 in which the displacing lever mechanism includes a U-shaped member resiliently pivoted on the center bar and having the legs of said U-shaped member occurring on two opposite sides of the center bar.

References Cited

UNITED STATES PATENTS

| 1,462,233 | 7/1923 | Kerr | 214—511 |
| 1,710,893 | 4/1929 | Phillips | 214—511 |
| 2,813,647 | 11/1957 | Hauck | 214—511 |
| 2,953,267 | 9/1960 | Gorman | 214—511 |
| 2,978,127 | 4/1961 | Gorman | 214—511 X |
| 3,308,978 | 3/1967 | Smith | 214—511 |

BENJAMIN HERSH, *Primary Examiner.*

J. A. PEKAR, *Assistant Examiner.*